(12) United States Patent
Iida et al.

(10) Patent No.: US 7,027,082 B2
(45) Date of Patent: Apr. 11, 2006

(54) IMAGE RECORDING APPARATUS AND IMAGE RECORDING SYSTEM

(75) Inventors: Toyoo Iida, Kyoto (JP); Masanori Sato, Kyoto (JP); Tomoki Ishizawa, Kyoto (JP); Hitoshi Oba, Kyoto (JP)

(73) Assignee: Omron Corporation, Kyoto (JP)

( * ) Notice: Subject to any disclaimer, the term of this patent is extended or adjusted under 35 U.S.C. 154(b) by 700 days.

(21) Appl. No.: 09/809,081

(22) Filed: Mar. 16, 2001

(65) Prior Publication Data
US 2001/0022614 A1 Sep. 20, 2001

(30) Foreign Application Priority Data
Mar. 17, 2000 (JP) .............................. 2000-076103

(51) Int. Cl.
*H04N 7/18* (2006.01)
(52) U.S. Cl. ........................................................ 348/92
(58) Field of Classification Search ................... 348/86, 348/92, 126, 127, 128, 130, 25, 715; 382/149, 382/107, 110, 289, 284
See application file for complete search history.

(56) References Cited

U.S. PATENT DOCUMENTS

| | | | |
|---|---|---|---|
| 4,977,451 A | 12/1990 | Besnard | |
| 5,367,332 A | 11/1994 | Kerns et al. | |
| 5,686,960 A * | 11/1997 | Sussman et al. | 348/218 |
| 5,822,542 A * | 10/1998 | Smith et al. | 709/247 |
| 5,901,854 A * | 5/1999 | Ishii | 209/538 |
| 6,271,520 B1 * | 8/2001 | Tao et al. | 250/330 |
| 6,630,998 B1 * | 10/2003 | Welchman et al. | 356/394 |

FOREIGN PATENT DOCUMENTS

| | | |
|---|---|---|
| DE | 298 15 797 U1 | 10/1998 |
| DE | 197 49 182 A1 | 5/1999 |

OTHER PUBLICATIONS

Thomas et al., "Real-time Industrial Visual Inspection: A Review", *Real-Time Imaging*, 1995, pp. 139-158, vol. 1, Academic Press Limited.

* cited by examiner

*Primary Examiner*—Vu Le
*Assistant Examiner*—Behrooz Senfi
(74) *Attorney, Agent, or Firm*—Foley & Lardner LLP

(57) ABSTRACT

An image recording system includes first imaging means for imaging operations of manufacturing equipment in a production line, second imaging means arranged downstream from the manufacturing equipment for imaging articles processed by the manufacturing equipment, inspection means for inspecting the processed articles based on image data outputted from the second imaging means, and an image recording apparatus for acquiring data outputted from the first imaging means and the inspection means, wherein the image recording apparatus is equipped with a temporary storage portion for temporarily storing image data from the imaging means, storage means, and control means for reading out any desired interval from the image data stored a prescribed time interval portion in the past in the temporary storage portion and storing such read out interval when a signal based on inspection results outputted from the inspection means is received.

13 Claims, 6 Drawing Sheets

//IMAGE RECORDING APPARATUS AND IMAGE RECORDING SYSTEM

FIELD OF THE INVENTION

The present invention relates to an image recording apparatus and image recording system.

DESCRIPTION OF PRIOR ART

In one example of a prior art quality control system for a factory production line (manufacturing process), a visual sensor is arranged at a prescribed position of the production line to pick up images of the products conveyed on such production line, and then an image recognition process is carried out based on the image data picked up by the visual sensor to judge whether or not the imaged product is a conforming product. Then, in the case where the imaged product is judged to be a nonconforming product, such product is discarded. In this way, only conforming products are shipped out, and this makes it possible to guarantee the quality of the products.

On the other hand, in recent years, in the quality control and quality maintenance of the manufacturing process, attention has shifted from discarding nonconforming products that have been previously detected in a reliable manner to suppressing the generation of such nonconforming products. In order to do this, the cause of the generation of nonconforming products has to be identified, and then appropriate improvements to the production equipment need to be carried out.

However, in the prior art system described above, even though it is possible to detect the generation of nonconforming products, it is not possible to identify the cause of the generation of such nonconforming products. Further, even when looking at a generated nonconforming product, if nonconformity is due to printing defects such as missing or flawed print, because such defects are small, it is difficult to predict the cause.

Further, while it is possible to have an observer identify the cause of the generation of nonconforming products by monitoring image data obtained by imaging with a video camera in addition to the visual sensor, because there are many related defects due to extremely fine movement of the equipment, not only is detection difficult, but the identification of the manufacturing step related to the product judged to be a nonconforming product is complicated.

Further, when monitoring and judgements are carried out based on data imaged by a video camera operating in a NTSC (National Television System Committee) system, the following problems occur. Namely, in a NTSC system, an odd-numbered field and an even-numbered field are alternately imaged, and then during playback, these pair of fields are combined to create a singe frame which is outputted. In this arrangement, moving images are displayed at 30 frames per second.

In this case, when monitoring the production process, in the case where the articles forming the observation objects on the production line are moving at high speed, the position of the article at the time the odd-numbered field of the pair fields is imaged is different from the position of the article at the time the even-numbered field of the pair of fields is imaged. For this reason, when these two fields are combined, the contours do not match smoothly, and this makes observation difficult. Accordingly, it becomes difficult to detect the difference in the fine movement of the equipment described above.

Further, in order to solve such problem, it is possible to create one frame from one field. However, when the top and bottom scanning lines are connected, the resolution of the image in the vertical direction becomes ½, and this makes observation difficult. Further, when display is carried out by doubling and expanding each scanning line in the vertical direction, due to the difference between the scanning position of the odd-numbered fields and the even-numbered fields, the image will oscillate up and down by one field unit, and this flickering image makes observation difficult.

SUMMARY OF THE INVENTION

It is an object of the present invention to provide an image recording apparatus and image recording system which makes it possible to easily identify the cause of the generation of nonconforming articles based on images formed by playing back moving images and the like imaged by imaging means such as a video camera or the like.

The image recording apparatus according to the present invention is used in an inspection system which includes imaging means for imaging operations of manufacturing equipment in a production line, and inspection means arranged downstream from the manufacturing equipment to inspect products processed by the manufacturing equipment. Further, the image recording apparatus is equipped with a temporary storage portion for temporarily storing image data from the imaging means, storage means, and control means for reading out any desired interval from the image data stored a prescribed time interval portion in the past in the temporary storage portion, and storing such read out interval in the storage means when a signal based on inspection results outputted from the inspection means is received.

In this regard, the "signal based on the inspection results" corresponds to the "NG signal (nonconforming article detection signal)" in the embodiments, but the present invention is not limited to this NG signal, and in addition to signals such as an "OK signal (conforming article detection signal) and an "inspection completion signal", it is possible to use any signal that is outputted based on the inspection results. In the case of a "nonconforming article detection signal", a nonconforming recording (i.e., image data from the imaging of the manufacturing process of the nonconforming article is recorded to identify the cause of the generation of the nonconforming article) is carried out, in the case of a "conforming article detection signal", a conforming recording (i.e., image data from the imaging of the manufacturing process of the conforming article is recorded) is carried out, and in the case of an "inspection completion signal", a total recording is carried out. In the present invention, the recording function may be based on one or more of these signals, or on one or more of any number of appropriate signals. In other words, the present invention is not limited to the three signals mentioned above. Of course, a function for recording based on a plurality of signals may be provided, and in this case when one of such plurality of signals is detected, the corresponding image data is recorded.

Further, in the embodiments of the present invention, the control means corresponds to the CPU 12a, the temporary storage portion corresponds to the main memory 12c, the storage means corresponds to the storage device 12h, the imaging means corresponds to the video camera 13, and the inspection means corresponds to the visual sensor 11. In the embodiments, the inspection means is formed from a visual sensor which is separate from the recording apparatus, but it is of course also possible for the visual sensor to be an integral part of the recording apparatus.

Further, there are of course cases where the image data of the previous fixed time interval to be acquired is only at the point in time of the previous fixed time interval, but as described in the embodiments of the present invention, image data of a recording time interval using such point in time as a reference is also included. In this regard, by establishing a long recording time interval, it is possible to reliably acquire image data of the manufacturing process (which caused the generation of the nonconforming article in the case of a nonconforming article detection signal) carried out on the nonconforming article and the other inspection articles of the signal outputted from the detection means, but if the recording time interval is made too long, the storage capacity of the storage means will go up and the amount of useless image data will increase, and this in turn can complicate the check carried out after playback. Accordingly, an appropriate interval is determined by taking these points into consideration.

In accordance with the present invention, when a signal based on inspection results is outputted from the inspection means, because image data stored a prescribed time interval portion in the past in the temporary storage portion is read out and stored in the storage means, when the previous fixed time interval is established so as to include the point in time where processing was carried out by the manufacturing equipment on the article causing a signal to be outputted from the inspection means for a nonconforming article, conforming article or the like, the process (the action which caused a problem in the case where the signal based on the inspection results is a nonconforming article detection signal) carried out by the manufacturing equipment on such article is automatically preserved in the storage means. Accordingly, after that is done, by playing back the image data stored in the storage means, it is possible to check whether or not there was an action or the like that caused a problem.

Preferably, the temporary storage portion stores image data in a manner related to the order in which such data was received, and in the case where image data of a prescribed time interval portion is stored, the image data stored at the beginning is rewritten to make it possible to temporarily preserve (by means of the "ring buffer" in the embodiments) image data of a previous prescribed time interval portion and acquire any desired interval.

In this regard, the term "stores image data in a manner related to the order in which such data was received" means that the image data is stored in a way that makes it possible to understand the order in which such image data was received, and in the case where the image data is stored in a continuous series of addresses, the image data is stored sequentially from the head address, and when image data is stored in the last address, the image data that follows is rewritten into such series of addresses starting again from the head address. Of course, in the case where the addresses are scattered, a pointer indicating the next image data may be provided together with a file or the like for controlling a separate order.

Further, the image recording system of the present invention is equipped with first imaging means for imaging operations of manufacturing equipment in a production line, second imaging means arranged downstream from the manufacturing equipment for imaging articles processed by the manufacturing equipment, inspection means for inspecting the processed articles based on image data outputted from the second imaging means, and an image recording apparatus for acquiring data outputted from the first imaging means and the inspection means. Further, the image recording apparatus includes a temporary storage portion for temporarily storing image data received from the first imaging means, storage means, and control means for reading out any desired interval from the image data stored a prescribed time interval portion in the past in the temporary storage portion and storing such read out interval in the storage means when a signal based on inspection results outputted from the inspection means is received.

In the embodiments of the present invention, the first imaging means corresponds to the video camera 13, the second imaging means corresponds to the camera 10, and the inspection means corresponds to the visual sensor 11. In this regard, the inspection means can be provided separate from the image recording apparatus, or the inspection means can of course be provided as an integral portion of the image recording apparatus.

In accordance with this invention, in the case where a certain signal is outputted based on inspection of an article by the inspection means, image data from the imaged process carried out by the manufacturing equipment on the inspected article is reliably stored in the storage means.

Further, in another embodiment of the present invention, an image recording apparatus which makes it possible to read out field image data stored in a storage means and play back and output frame image data is equipped with frame creating means (which corresponds to the CPU 12*a*) which carries out a prescribed supplemental process based on one field of image data stored in the storage means to create one frame of image data, wherein, when at least the created frame image is outputted and displayed in a normal display region, the top end line and the bottom end line of the frame image are excluded from the display region.

Now, because one frame is created from one field, it is possible to eliminate the blurring of the contours in the movement direction even in the case where the imaged article is moving. Further, because at least one line at the top end and bottom end are excluded from the normal display region, it is also possible to eliminate the one-line up and down oscillation and blurring at the time of playback.

In this regard, as described in the embodiments of the present invention, the exclusion of at least one line from the top end and bottom end of the display region may be carried out by excluding the related pixel portions when the one frame is created, or this exclusion may be carried out by any of various other methods, such as by having the creation/supplementation process prevent the top end line and the bottom end line from being displayed. Further, while the exclusion of only one line from the top end and the bottom end is preferred, it is also possible to exclude a plurality of lines.

Now, it should be noted that the structural elements of the present invention described above can be combined in any possible way. Further, each of the means used to construct the image recording apparatus and the image recording system according to the present invention can be achieved by exclusive hardware circuits or by a programmed computer.

DETAILED DESCRIPTION OF THE PREFERRED EMBODIMENTS

Figure 1:
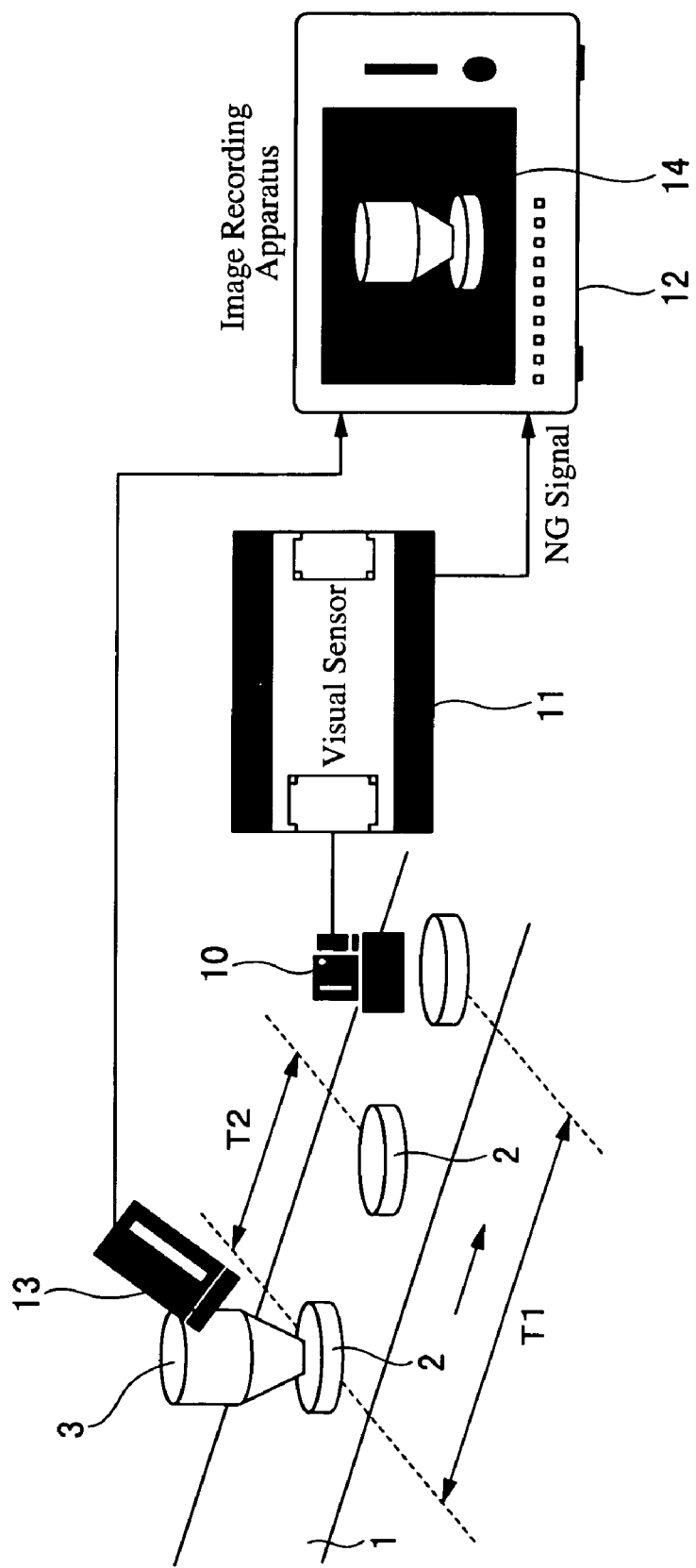
FIG. 1 shows an example of a production line in which the present invention is applied.

FIG. 1 shows a portion of a production line in which the present invention is applied. As shown in these drawings, articles 2 which form process objects (i.e., objects that will be processed) are placed on a conveyer 1 at prescribed spacings, and in this state the articles 2 are conveyed by the conveyor 1. These articles 2 undergo a prescribed process by manufacturing equipment 3 provided at a prescribed position of the conveyor 1. In this connection, because each of the articles 2 is only placed on top of the conveyor 1, the articles 2 can slip during conveyance and the actual position of each article 2 can shift forward or backward at the time of placement, and for these reasons, the forward and backward spacing of tw articles 2 during conveyance is not fixed.

In this production line, a camera 10 for taking images of the articles 2 is arranged above the conveyor 1 in the same manner as is done in the prior art, and the images (which form inspection objects) of the articles 2 taken by the camera 10 are sent as image data to a visual sensor 11. Then, in the visual sensor 11, a prescribed image recognition process is carried out on the image data of the imaged article 2 to judge whether a defect is present or absent, and in the case where a defect is present, a NG signal is outputted. This NG signal is sent to an image recording apparatus 12 according to the present invention.

Now, in the present invention, a video camera 13 (which carries out imaging by a NTSC system) is provided near the manufacturing equipment 3 to carry out imaging of normal operations of the manufacturing equipment 3, and the images (moving images) data picked up by the video camera 13 are sent to the image recording apparatus 12. Then, in the image recording apparatus 12, the moving image data supplied from the video camera 13, namely, the momentarily imaged field data is temporarily preserved for a fixed period of time, and when the NG signal from the visual sensor 1 is received, the image (moving image) data imaged by the video camera 13 at the point in time when the article 2 inspected by the visual sensor 11 undergoes manufacturing, namely, at the point in time when such article 2 is at the position of the manufacturing equipment 3 is properly preserved.

Further, a display portion 14 formed from a liquid crystal panel is provided in the image recording apparatus 12, and by operating a control panel and remote control 16 to send a playback command, it is possible to display the preserved images (moving images) on the display portion 14. In this way, by checking the images played back on the display screen, the user can reliably identify the cause of the generation of defects. Namely, because the NG signal of the inspection results and the image data obtained by imaging the manufacturing equipment 3 are synchronized (connected), the manufacturing step where the cause of the defect likely occurs is automatically extracted and such portion is held in storage, and because it is possible to discard useless image data, it is possible to carry out a highly accurate check for defects even when the memory capacity is not very large. Furthermore, because the preserved image data was obtained by imaging the manufacturing step where the cause of the defect occurred, by merely carrying out a comparison with image data obtained by imaging the series of manufacturing steps having no relation to the NG signal, the image of the step where the cause of the defect occurs can be found extremely easily and accurately, and by observing this image, the related cause can be identified with very little effort.

Figure 2:
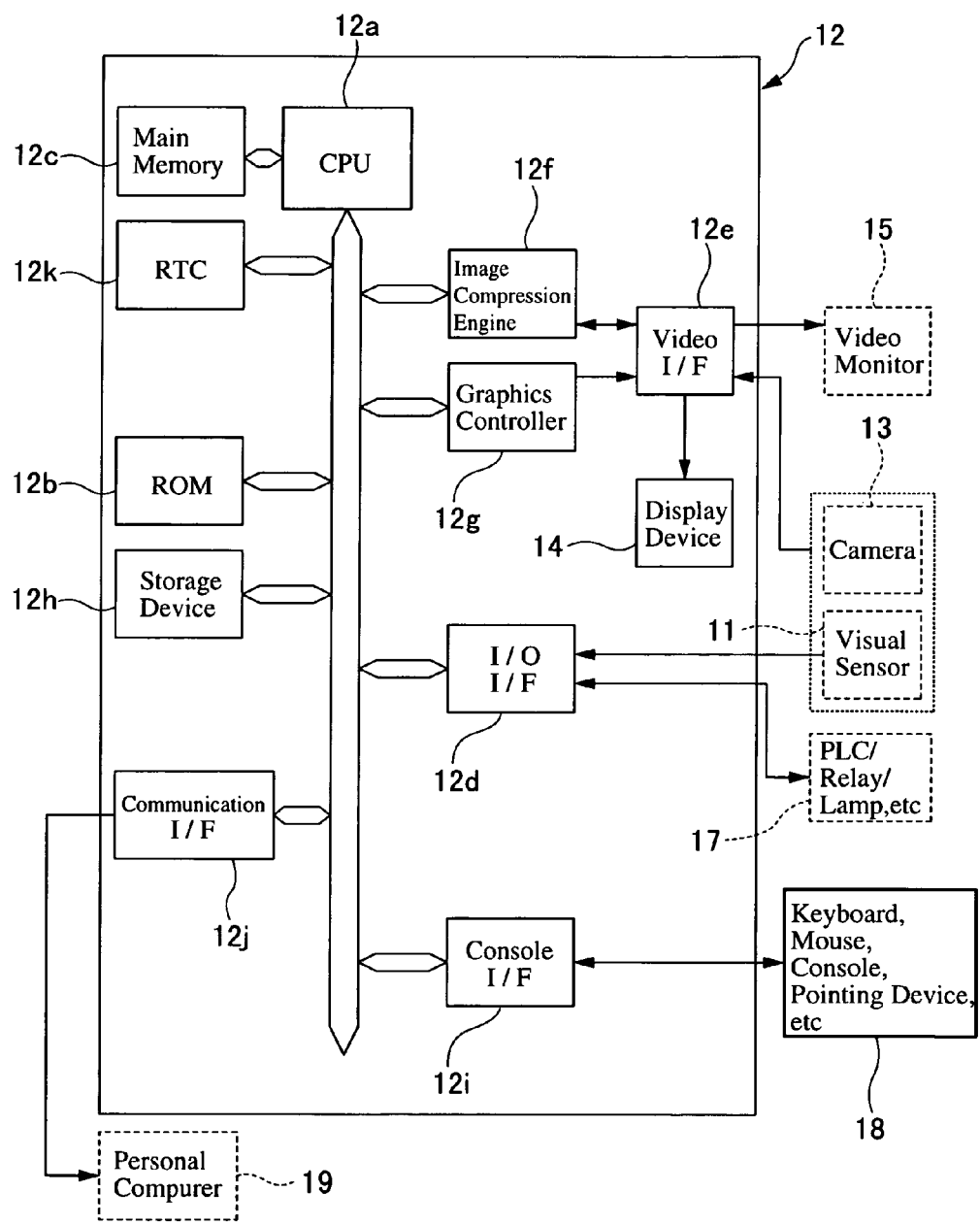
FIG. 2 shows an embodiment of the image recording apparatus according to the present invention.

Next, FIG. 2 shows an example of an actual internal structure of the image recording apparatus 12 having the functions described above. First, the image recording apparatus 12 is equipped with a CPU 12*a* made from a chip microcomputer. While making suitable use of a main memory 12*c*, this CPU 12*a* carries out prescribed processes and the like related to the present invention based on process programs, parameters and the like stored in a ROM 12*b*. In this regard, the actual process method will be described below. Further, the ROM 12*b* is constructed from a nonvolatile memory such as a EPROM, DTPROM or the like.

Then, the NG signal from the visual sensor 11 is sent to the CPU 12*a* via an I/O interface 12*d*. Namely, the I/O interface 12*d* is a multiple contact I/O interface equipped with a function to read in ON/OFF signals from the outside, and output ON/OFF signals to the outside. Accordingly, by connecting the visual sensor 11 to the I/O interface 12*d*, it is possible to acquire the NO signal as an ON/OFF signal. Further, by connecting devices 17 such as a PLC, relay, lamp and the like to the I/O interface 12*d*, it is possible to send ON/OFF control commands to such devices. These control commands are also sent out from the CPU 12*a*.

Further, the image signal from the video camera 13 imaging the manufacturing equipment 3 is acquired internally via a video interface 12*e*. Namely, the video interface 12*e* carries out an A/D conversion to convert the analog image signal sent from the video camera 13 to a digital image signal, and then the digital image signal is transferred to an image compression engine 12*f*.

The image compression engine 12*f* carries out real-time compression/expansion of the acquired image data for each field unit. Accordingly, the digital converted image data received from the video interface 12*e* is compressed and then sent to the CPU 12*a*. Further, the image data for output display acquired from the CPU 12*a* and the like is expanded by the image compression engine 12*f* and then transferred to the video interface 12*e*.

Then, because the video interface 12*e* is connected to the internal display device 14 and the external monitor 15, the expanded image is outputted and displayed on the display device 14 and/or the external monitor 15.

Further, a graphics controller 12*g* is connected to the video interface 12*e*, and the menu, characters, lines and the like created by the graphics controller 12*g* are acquired and displayed on the internal display device 14 and the external monitor 15.

Furthermore, the image recording apparatus 12 is also equipped with a storage device 12*h* which is a nonvolatile memory for storing recorded data and a portion of the system program; a console interface 12*i* which receives data from and transmits data to a connected pointing device 18 such as a keyboard, mouse, console unit or the like for controlling the image recording apparatus 12; a communication interface 12*j* for making a connection to an Ethernet or the like; and a real time clock (RTC) 12*k* for controlling the clock (year, month, day, hour, minute, second) inside the system. In this regard, because each of these devices has the same basic hardware structure as those devices from the prior art, a detailed description of such devices is omitted.

Figure 3:
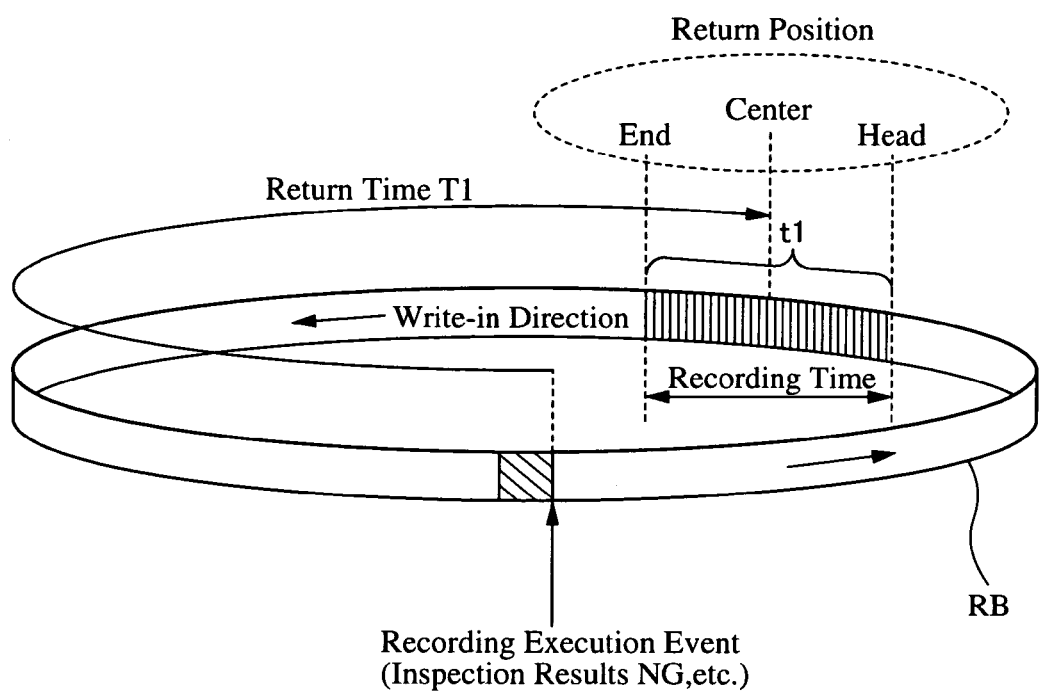
FIG. 3 is an illustration for describing the ring buffer and usage state thereof.
Figure 4:
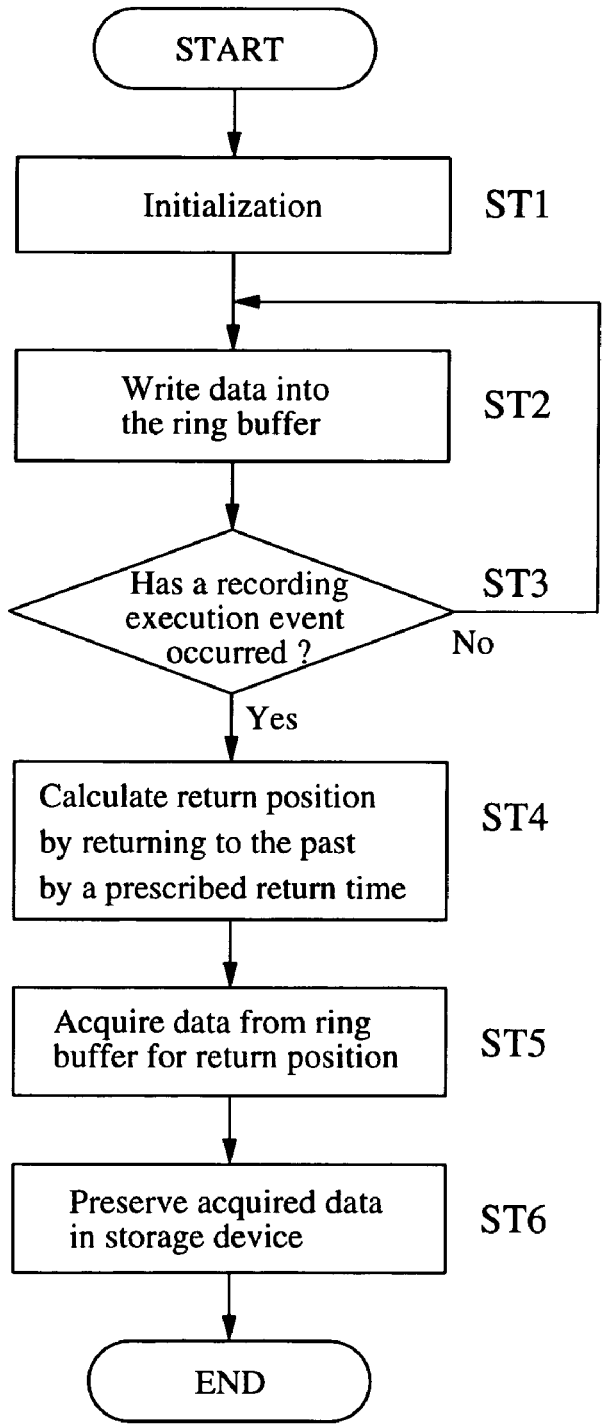
FIG. 4 is a flow chart showing the function of the CPU.

Now, in the present invention, the CPU 12a forms a ring-shaped buffer (ring buffer) RB in the main memory 12c as shown in FIG. 3, and the writing of data into this ring buffer RB is controlled by the CPU 12a in accordance with the flow chart shown in FIG. 4. In this regard, the memory capacity of the ring buffer RB is established to make it possible to store a Tmax (in seconds) portion image data and information related thereto.

Furthermore, when a recording execution event does not occur, Steps 1 and 2 are repeated, and then after Tmax, the formed ring buffer RB becomes full with data stored therein. Accordingly, in the case where an image is subsequently acquired, such acquired image data is first written and preserved in a region where image data is stored. In this way, from the beginning of recording until after Tmax, the image during the previous Tmax interval is kept in a temporarily preserved state in the ring buffer RB.

Further, in the case where a defect is detected by the visual sensor 11 and a NG signal is outputted, the images of the processes carried Out by the manufacturing equipment 3 on the article 2 which caused the defect thereof are stored in the ring buffer RB at a fixed time interval before such detection by the visual sensor 11. Namely, the images outputted from the video camera 13 when the defective article 2 was at the position of the manufacturing equipment 3 is the object image data. Accordingly, because the conveyance time T1 it takes for the article 2 to reach the imaging region of the visual sensor 11 from the manufacturing equipment 3 is known in advance, the images recorded in the past by only a time T1 from the point in time when the NO signal was outputted forms the object image data.

Now, in order to investigate the cause of the defect, because the series of process steps carried out on the article 2 by the manufacturing equipment 3 needs to be inspected, it is necessary to acquire the moving image data (plural field portion) for the period of time where such series of process steps were carried out. Furthermore, in view of the fact that the actual conveyance time will vary by a certain degree, and the fact that the spacing of the articles 2 in front and behind will vary, by collecting image data for a time (recording time t1) portion established to be slightly longer by adding a prescribed margin, it is possible to reliably acquire the process steps carried out by the manufacturing equipment 3 for the defective article 2.

Accordingly, when a NO signal is generated, the system returns to the point in time in the past by exactly a return time T1 (conveyance time), and with this return time point (return position) as a reference point, image data from the recording time t1 is read out and then stored in the storage device 12h. The execution of such process is one of the functions of the CPU 12a, and the specific steps thereof are shown in FIG. 4.

First, initialization is carried out, during which the return time T1 and the recording time t1 are set (ST1). In order to carry out this initialization, the CPU 12a displays various input pictures on the display apparatus 14 and the like via the graphics controller 12g. Then, data (return data) inputted by the user by the pointing device 18 in accordance with such display or return data calculated based on such input is preserved. Further, as shown in FIG. 3, the designation of the return position based on the return time may be the center position, head position or end position of the recording time t1. The specific method of such input is described later.

Next, the system proceeds to actual monitoring operations. Namely, the moving image data (each field) sent sequentially from the video camera 13 is compressed by the image compression engine 12f, and such compressed data is sequentially written into the ring buffer RB from the head thereof. At this time, time data from the real time clock 12k is read out, and then the time (time stamp) each image is recorded and the record number (consecutive number from the point in time where recording is started) are connected and stored sequentially (ST2).

Next, a judgement of whether or not a recording execution event (in the present embodiment, the NG signal from the visual sensor 11) occurred is carried out (ST3), and in the case where an event does not occur, the process returns to Step 2, and the writing in of the next image data (field) is carried out.

On the other hand, in the case where a NG signal (recording execution event) is generated, a YES judgement is made at Step 3 and the process proceeds to Step 4, and the return position is calculated by returning to the point in time in the past by exactly the return time determined at initialization (ST4). Then, from the calculated return position and the recording time, the data (the fields preserved during the recording time) temporarily preserved in the ring buffer RB that should be recorded is acquired (ST5).

Next, this acquired data is written into the storage device 12h. In this way, the moving image data of the fixed period of time which includes the manufacturing process of the defective product is automatically selected and stored in a nonvolatile memory. Accordingly, thereafter, by playing back the image data stored in the storage device 12h, it is possible to detect where the defect occurred.

Now, as shown in the flow chart of FIG. 4, when a recording execution event occurs, at that point in time the recording of new data into the ring buffer RB is suspended. However, the present invention is not limited to this arrangement, and because sequential image data (fields) will be sent so long as the operations of the video camera 13 are not temporarily suspended due to suspension of the production line or the like, such data may be continuously stored in the ring buffer RB in accordance with the occurrence of the next nonconforming article (defect).

Figure 5:
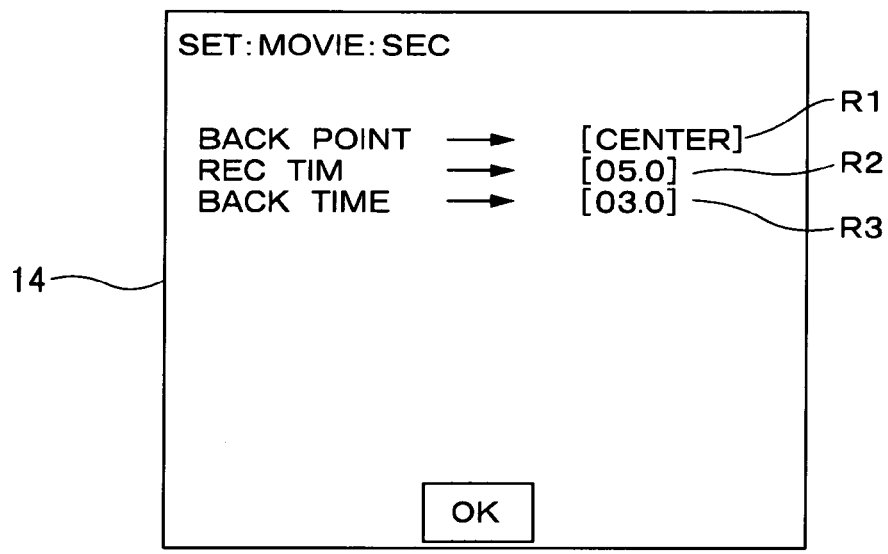
FIG. 5 shows an example of an initialization input screen.

Next, FIG. 5 shows an example of an input screen displayed on the display device 14 during initialization, in which input is carried out by character interface. In this input screen, the upper region R1 is established to specify the return position ("BACK POINT") by selecting from the three designations "HEAD", "CENTER", "END". Further, the center region R2 is established for inputting the recording time, and the lower region R3 is established for inputting the return time ("BACK TIME"), and in the present embodiment, both of these times are selectively specified by 0.1 second units. Namely, establishable conditions are prepared for each of these three parameters, and by controlling the pointing device 18, the user can sequentially switch the selected value displayed in each region, and when the desired conditions have been selected, each value can be fixed by clicking a confirmation ("OK") key displayed on the variable center of the display screen.

In the example shown in FIG. 5, "CENTER" is established as the BACK POINT "05.0" is established as the REC TIME, and "03.0" is established as the BACK TIME. Accordingly, recording is carried out for the time period from 6.5 seconds until 3.5 seconds before the generation of the NG signal.

Figure 6:
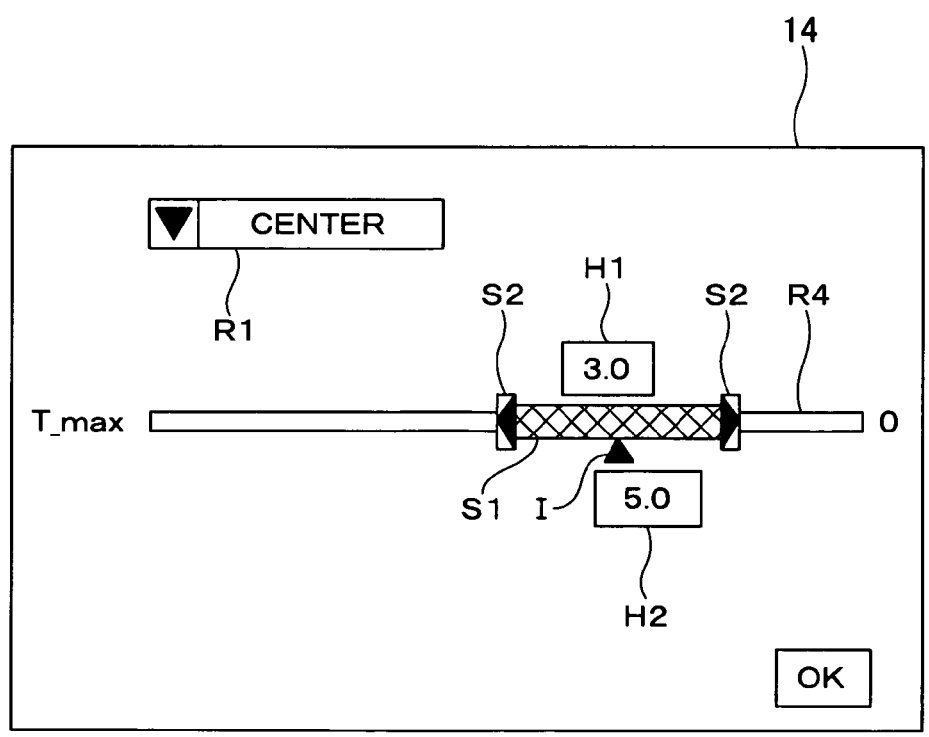
FIG. 6 shows another example of an initialization input screen.

Further, it should be noted that the input screen is not limited to the character interface described above, and it is possible to establish other input screens, for example, by using a GUI or the like. In this connection, FIG. 6 shows another example of an input screen, in which the region R1 for inputting the return position is established in the upper left portion of the input screen. Further, a horizontally extending band-shaped time input region R4 is established in the center portion of the input screen, and the return time and recording time are respectively specified by a movable return time adjustment sliding indicator S1 and movable recording time adjustment sliding indicators S2 established at both ends of the return time adjustment sliding indicator S1. In this example, the return time and recording time are established by operating the console 18 to move each of the sliding indicators S1, S2 in the appropriate left and right directions.

Namely, each time is calculated from the positions where the sliding indicators S1, S2 are moved to, and then the recording time is displayed in a recording time display portion H1, and the return time is displayed in a return time display portion H2. Further, by moving the recording time adjustment sliding indicators S2, the length of the return time adjustment sliding indicator S1 existing therebetween is expanded or contracted. In this way, the recording time and return time (return position) can be understood intuitively based on a visual inspection of the input screen.

Further, a triangle-shaped return position indicator I is displayed below the time input region R4 at a position corresponding to the return position established in the return position input region RI. For example, in the case of the input screen shown in FIG. 6, because "CENTER" is established as the return position, the return position indicator I is also displayed in the center of the return time adjustment sliding indicator S1. Similarly, in the case where the return position is at the head, the return position indicator I is displayed at the left side of the return time adjustment sliding indicator S1, and in the case where the return position is at the end, the return position indicator I is displayed at the right side of the return time adjustment sliding indicator S1.

Further, in the two input screens described above, both the return time and recording time are indicated by real time (in seconds). However, the present invention is not limited to such arrangement, and it is also possible, for example, to indicate such times by a tact. In this regard, a tact is generally a unit for controlling the manufacturing time in the manufacturing process, and this unit is the time (T2 in FIG. 1) it takes to perform one process operation or assembly operation on one product using one piece of equipment.

Figure 7:
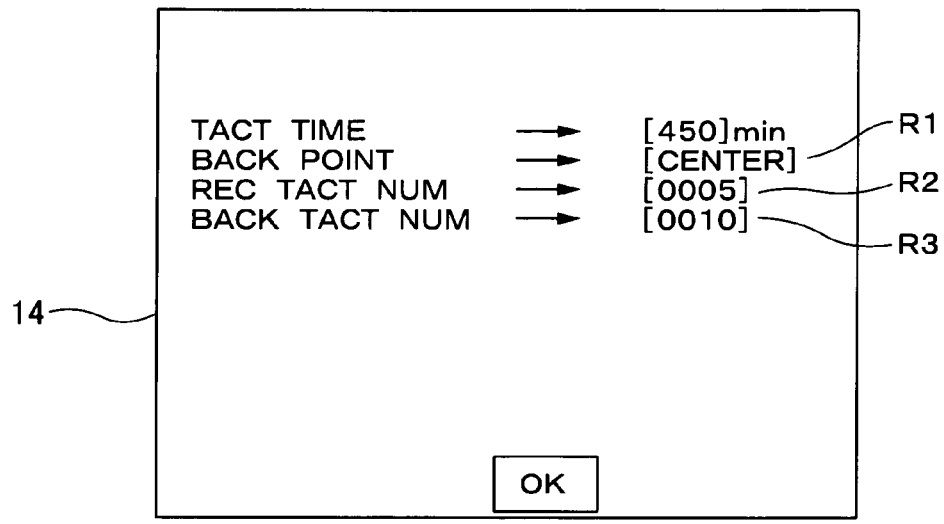
FIG. 7 shows another example of an initialization input screen.
Figure 8:
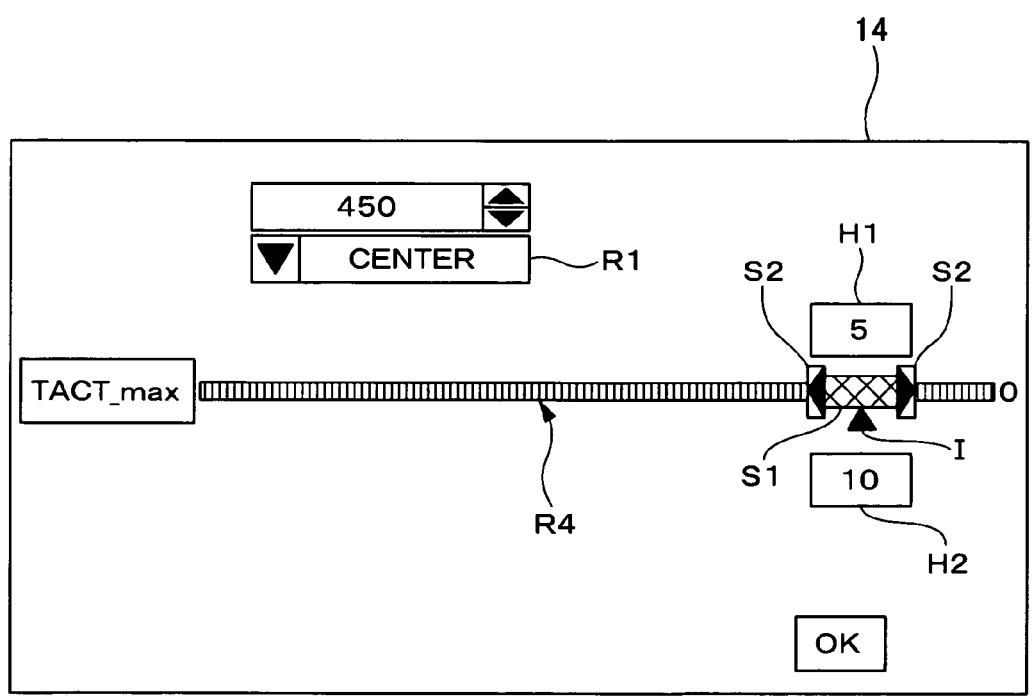
FIG. 8 shows another example of an initialization input screen.

Accordingly, in the example shown in FIG. 1, the return time from the imaging region of the visual sensor 11 to the manufacturing equipment 3 forms "two tacts in the past." Now, because this manner of specifying times in terms of tacts makes it easy for the user to gain an intuitive understanding of such times, the method of inputting the recording time as N tacts and the return time as M tacts before the present time is permitted. Further, in addition to such information, the number of products manufactured per unit time (tact time) is inputted. In this way, after the CPU 12a calculates the reference time T2 required to produce one product from the number of products manufactured per unit time, the recording time and return time are calculated by multiplying this reference time T2 by the inputted tact numbers N, M, and then these values are stored as initialization conditions. In this regard, FIG. 7 (character interface) and FIG. 8 (GUI) show specific examples of input screens established using tact information.

Further, the image data stored in the storage device 12h can of course be displayed on the display device 14 as described above, and by connecting to a network such as an Ethernet or the like via the communication interface 12j, data can be sent to the personal computer 19 (FIG. 2) and the like connected to such network to enable control to be carried out by the personal computer 19. Further, the data transmission system is not limited to the communication system described above, and it is of course possible to use various recording media.

Incidentally, the moving image data stored in the storage device 12h for investigating the cause of defects is read out and displayed on the display device 14 and the like as described above, but in the present embodiment, one frame is created based on one field in order to suppress slippage in the left and right directions (moving directions).

In this regard, because there is half the number of scanning lines in one field, when expansion is carried out by the image compression engine 12f, the CPU 12a carries out a supplemental process to perform playback under the conditions described below.

Namely, because the scanning lines of the odd-numbered fields are 1, 3, 5, . . . , and the scanning lines of the even-numbered fields are 2, 4, 6, . . . when one frame is created from each field, data from the original scanning lines is used without alteration, and in the case of insufficient scanning lines (even-numbered scanning lines in the case of an odd-numbered field, and odd-numbered scanning lines in the case of an even-numbered field), supplementation is carried out by taking the average of the upper and lower adjacent scanning lines. Further, each pixel value of the upper and lower end lines are 0, namely, they are not displayed. In this way, when an odd-numbered field and an even-numbered field are alternately outputted, the blurring at one line up and one line down is eliminated.

Accordingly, because the images (after supplementation) displayed on the display device 14 and the like can be played back clearly without blurring at the top, bottom, left and right, it is possible to reliably carry out detection even when there is a fine difference in operations.

Next, the specific computation algorithm carried out by the CPU 12a for laying back frames after the above-described supplementation is completed will be described for the case where the display image is 640×480 and the field image is 640×240.

First, the even-numbered field is constructed from the 240 lines in the even-numbered sequence 0, 2, 4, . . . , 478, and the odd-numbered field is constructed from the 240 lines in the odd-numbered sequence 1, 3, 5, . . . , 479. Accordingly, for the image data obtained by actual imaging, the even-numbered field and odd-numbered field are as follows:

*Even Numbered Field
$IFD1(x, y)$ where $x=0~639$, $y=$even numbers $0~478$
*Odd.Numbered Field
$IFD2(x, y)$ where $x=0~639$, $y=$odd numbers $1~479$ Accordingly, the frame image IFM $(x, y)$ after supplementation is calculated as shown below, where $x=0~639$, $y=1~478$.

*Image Created Based on Even-Numbered Field
$IFM(x, y)=IFD1(x, y)$ [when y=even numbers 2~478]
$IFM(x, y)=IFD1(x, y-1)+IFD1(x, y+1)/2$ [when y=odd numbers 1~477]
$IFM(x, y)=0$ [when y=0, y=479]
*Image Created Based on Odd-Numbered Field
$IFM(x, y)=IFD2(x, y-1)+IFD2(x, y+1)/2$ [when y=even numbers 2~478]
$IFM(x, y)=IFD2(x, y)$ [when y=odd numbers 1~477]
$IFM(x, y)=0$ [when y=0, y=479]

As described above, in the present invention, because image data of an imaged nonconforming product obtained from the images picked up by an imaging means such as a video camera or the like is automatically stored in a storage means, thereafter it is possible to easily extract the image data where a problem occurs. Accordingly, by carefully observing such image data, it becomes possible to identify the cause of the generation of nonconforming articles (defects). Further, when the image data is being confirmed, because at least one line is eliminated from the top and bottom ends, even when one frame is played back based on one field, for example, the frames based on the even-numbered fields and the odd-numbered fields do not oscillate up and down, and because it is possible to detect fine movement of the equipment, the identification of the cause of the generation of nonconforming articles (defects) can be easily carried out. Namely, the present embodiment functions as a support apparatus for easily identifying the cause of the generation of nonconforming articles (defects).

What is claimed is:

1. An image recording apparatus for use in an inspection system which includes imaging means for imaging operations of manufacturing equipment in a production line, and inspection means arranged downstream from the manufacturing equipment to inspect products processed by the manufacturing equipment, comprising:
    temporary storage portion for temporarily storing image data from the imaging means;
    storage means;
    setting means for setting a return time and a recording time; and
    control means for reading out image data recorded over a time interval based on the set return time, the time interval being equal in duration to the set recording time, from the image data stored in the temporary storage portion, and storing such read out interval of the image data in the storage means when a signal based on inspection results outputted from the inspection means is received.

2. The image recording apparatus of claim 1, wherein the temporary storage portion stores image data in a manner related to the order in which such data was received, and wherein, in the case where image data recorded over the time interval is stored, the image data stored at the beginning is rewritten to make it possible to temporarily preserve image data of a previous prescribed time interval portion and acquire any desired interval.

3. The image recording apparatus of claim 1, further comprising:
    frame creating means which carries out a prescribed supplemental process based on one field of image data stored in the storage means to create one frame of image data;
    wherein, when at least the created frame image is outputted and displayed in a normal display region, the top end line and the bottom end line of the frame image are excluded from the display region.

4. The image recording apparatus of claim 1, wherein the return time is set based on a tact and a number of tacts, where a tact is a unit of time required to perform a predetermined process operation or predetermined assembly operation using the manufacturing equipment.

5. The image recording apparatus of claim 1, wherein the time interval includes a return position, which is earlier than a time at which the signal based on the inspection results is generated by a time amount equal to the return time.

6. The image recording apparatus of claim 5, wherein the return position is at the end of the time interval.

7. The image recording apparatus of claim 5, wherein the return position is at the center of the time interval.

8. The image recording apparatus of claim 5, wherein the return position is at the beginning of the time interval.

9. An image recording system, comprising:
    first imaging means for imaging operations of manufacturing equipment in a production line;
    second imaging means arranged downstream from the manufacturing equipment for imaging articles processed by the manufacturing equipment;
    inspection means for inspecting the processed articles based on image data outputted from the second imaging means; and
    an image recording apparatus for acquiring data outputted from the first imaging means and the inspection means, wherein the image recording apparatus includes:
        temporary storage portion for temporarily storing image data from the imaging means;
        storage means;
        setting means for setting a return time and a recording time; and
        control means for reading out image data recorded over a time interval based on the set return time, the time interval being equal in duration to the set recording time, from the image data stored in the temporary storage portion, and storing such read out interval of the image data in the storage means when a signal based on inspection results outputted from the inspection means is received.

10. The image recording system of claim 9, wherein the time interval includes a return position, which is earlier than a time at which the signal based on the inspection results is generated by a time amount equal to the return time.

11. The image recording system of claim 10, wherein the return position is at the end of the time interval.

12. The image recording system of claim 10, wherein the return position is at the center of the time interval.

13. The image recording system of claim 10, wherein the return position is at the beginning of the time interval.

* * * * *